United States Patent
Hodebourg

(10) Patent No.: US 9,574,670 B2
(45) Date of Patent: Feb. 21, 2017

(54) ENGINE CONTROL VALVE WITH IMPROVED SEALING

(71) Applicant: Valeo Systemes de Controle Moteur, Cergy St Christophe (FR)

(72) Inventor: Gregory Hodebourg, Sartrouville (FR)

(73) Assignee: Valeo Systemes de Controle Moteur, Cergy Saint Christophe (FR)

(*) Notice: Subject to any disclaimer, the term of this patent is extended or adjusted under 35 U.S.C. 154(b) by 54 days.

(21) Appl. No.: 14/411,922

(22) PCT Filed: Jul. 1, 2013

(86) PCT No.: PCT/FR2013/051536
§ 371 (c)(1),
(2) Date: Dec. 30, 2014

(87) PCT Pub. No.: WO2014/006311
PCT Pub. Date: Jan. 9, 2014

(65) Prior Publication Data
US 2015/0323080 A1  Nov. 12, 2015

(30) Foreign Application Priority Data

Jul. 4, 2012  (FR) ...................................... 12 56390

(51) Int. Cl.
*F16K 1/226*  (2006.01)
*F02M 25/07*  (2006.01)
*F16K 1/22*  (2006.01)

(52) U.S. Cl.
CPC ............ *F16K 1/2263* (2013.01); *F02M 26/70* (2016.02); *F16K 1/22* (2013.01)

(58) Field of Classification Search
CPC .......... F16K 1/2263; F16K 1/22; F16J 15/122; F02M 11/02; F02M 11/06; F02M 35/10085

See application file for complete search history.

(56) References Cited

U.S. PATENT DOCUMENTS 5,158,265 A * 10/1992 Miyairi .................. F16K 1/222
                                                          251/305
6,585,272 B2 * 7/2003 Inamura ............... F16J 15/0818
                                                          277/592

(Continued)

FOREIGN PATENT DOCUMENTS

JP       S57-124162 A    8/1982
WO    2010/000752 A1    1/2010

(Continued)

OTHER PUBLICATIONS

International Search Report issued in PCT/FR2013/051536 mailed on Aug. 16, 2013 (4 pages).

*Primary Examiner* — Craig Schneider
*Assistant Examiner* — Kevin Barss
(74) *Attorney, Agent, or Firm* — Osha Liang LLP

(57) ABSTRACT

The invention relates to an engine control valve including a body defining an inner duct and comprising a flap (10) mounted such that it can pivot by means of a shaft (12), said flap (10) comprising a first portion (11). The flap can pivot between an open position allowing the passage of fluid into the duct and a closed position in which the flap (10) comes into contact with a flat seal (100) of the flap. The outer contour of the seal (100) surrounds the outer contour of the flap (10), said seal (1) comprising an opening (6) and a solid portion (3). The above-mentioned first portion (11) seals the opening (6) in the seal (1) when the flap (10) is in a closed position. The seal (100) includes a reinforcement area (101) in the solid portion (3) thereof, such as to prevent the seal (100) from deforming owing to the high pressure and high temperature of the gases in the valve.

11 Claims, 2 Drawing Sheets

(56) References Cited

U.S. PATENT DOCUMENTS

| | | | | |
|---|---|---|---|---|
| 6,962,349 B2* | 11/2005 | Notter | ................ | B32B 15/04 |
| | | | | 277/600 |
| 8,627,806 B2* | 1/2014 | Festor | ............... | F16K 1/2263 |
| | | | | 123/41.4 |
| 2013/0146038 A1* | 6/2013 | Adenot | ............ | F02M 25/0793 |
| | | | | 123/568.11 |
| 2013/0153804 A1* | 6/2013 | Adenot | ............ | F02D 9/1025 |
| | | | | 251/305 |
| 2014/0246001 A1* | 9/2014 | Hodebourg | ........ | F16K 11/0525 |
| | | | | 123/568.29 |
| 2015/0128891 A1* | 5/2015 | Hodebourg | .......... | F16K 1/2057 |
| | | | | 123/190.1 |
| 2015/0136061 A1* | 5/2015 | Hodebourg | .......... | F16K 1/2057 |
| | | | | 123/190.1 |
| 2015/0152755 A1* | 6/2015 | Hodebourg | ............. | F16K 1/54 |
| | | | | 123/188.1 |
| 2015/0176539 A1* | 6/2015 | Hodebourg | ....... | F02M 25/0793 |
| | | | | 123/190.17 |
| 2015/0211448 A1* | 7/2015 | Hodebourg | ....... | F02M 25/0793 |
| | | | | 123/190.17 |
| 2015/0240754 A1* | 8/2015 | Hodebourg | ....... | F02M 25/0793 |
| | | | | 251/331 |

FOREIGN PATENT DOCUMENTS

| | | | |
|---|---|---|---|
| WO | WO 2010000752 | * | 1/2010 |
| WO | 2012/001283 A1 | | 1/2012 |

* cited by examiner

ENGINE CONTROL VALVE WITH IMPROVED SEALING

The invention relates to an engine control valve with improved sealing. This type of valve may for example be fitted in a gas supply circuit of a vehicle combustion engine, in order to regulate the flow rate of the EGR (Exhaust Gas Recirculation) gases in a loop making it possible to bleed a part of the exhaust gases leaving the engine so as to reinject them upstream of said engine. The operating principle of this type of valve is based on the controlled rotation of a flap which can move from a completely open position for allowing the fluid to pass through to a closed position for blocking this passage. The subject of the invention is an engine control valve with improved sealing.

An engine control valve thus has a flap which is mounted in a pivoting manner on a rotary pin. Said pin can separate the flap into a first part and a second part. When this flap is in a closed position, it comes into contact with a gasket that is secured to the body of the valve, said gasket sealing the valve by acting as a positioning end stop for said flap. More specifically, the gasket can be flat overall and be fastened in the body of the valve by being inserted at its perimeter between two cast elements of said body. The gasket has an opening, and when the flap is in the closed position, the first part of the flap comes into contact with one of the two faces of the gasket in order to close off said opening, while the second part of said flap is flush with the other face of said gasket. The flap has a small thickness and has a rectangular overall shape.

At first, the gasket only covered three of the four peripheral edges of said flap, leaving a potential passage for the gases at the fourth edge of the flap, which is not covered by said gasket. Thus, when the flap is in the closed position against the gasket, said passage is likely to favor an accidental leak of the gases. This results in fairly mediocre sealing of said valve in the closed configuration.

Then, a solution for remedying this poor-quality sealing consisted in the manufacture of a gasket either in one part or in two parts, said gasket being sufficiently extensive to fully cover the four peripheral edges of the flap and thus to limit the sources of leaks.

However, with reference to FIG. 1, a problem that is regularly encountered with this type of extensive gasket 1 is that it is subjected both to a high pressure and to a high temperature by the gases present in the valve and it thus tends to deform under the effect of thermal expansion. Since said gasket is inserted at its outer edge 2 between two cast the deformation will essentially occur in the central part 3 of the gasket 1, creating bosses 4 and/or hollows which are likely to form leakage passages for the gases located in the valve. In other words, the use of a more extensive gasket 1 only shifts the problem initially encountered with a gasket that only partially covers the flap.

An engine control valve according to the invention employs an extensive gasket that entirely covers the four peripheral edges of the flap, said gasket being shaped so as not to deform under the effect of a high temperature and a high pressure of the gases. In this way, an engine control valve according to the invention has a double sealing level. A first level is linked to the fact that the gasket entirely covers the flap and thus does not leave any potential leakage passage, and a second level is linked to the fact that it does not deform under the combined effect of a high pressure and high temperature of the gases present in the valve.

The subject of the invention, according to one of its aspects, is an engine control valve having a body that delimits an internal duct and comprising a flap mounted in a pivoting manner by way of a pin, said flap comprising a first part and being able to pivot between an open position allowing fluid to pass through the duct and a closed position in which the flap comes into contact with a gasket, notably a flat gasket, of the valve, said gasket having an external contour that externally surrounds the external contour of the flap and comprising an opening and a solid portion, said first part closing off the opening in the gasket when the flap is in a closed position, the gasket having a reinforcing region in its solid portion, so as to prevent said gasket from deforming under the effect of a high pressure and a high temperature of the gases present in said valve.

Specifically, since the gasket is extensive and is fastened to the body of the valve at its peripheral edge, the central part of said gasket is supported little and is thus likely to deform easily under the effect of a high temperature and a high pressure of the gases. This deformation can result in bosses or hollows which will create potential leakage passages for the gases and thus affect the sealing of the valve when it is in a closed position. The reinforcing region on the gasket is thus intended to prevent this gasket from deforming so as to preserve its initial shape so that it can ensure high sealing quality for the valve. This reinforcing region that serves to at least partially stiffen the gasket can a priori have any shape, and consist for example of an overthickness of material or of a hollow relief of the rib type, produced by stamping the gasket. This reinforcing region advantageously does not make the flap heavier and advantageously does not increase its size, so as to prevent its rotary mechanism in the valve from being impeded.

Preferably, the gasket comprises an edge that defines a part of the contour of the opening, said edge being parallel to the pin of the flap, and the solid portion can extend between said edge and another edge of the gasket that forms a part of its external contour. This other edge of the gasket can also be parallel or not be parallel to the pin of the flap.

Preferably, the reinforcing region is positioned at least partially in the third of the solid portion of the gasket that is located closest to the opening. Specifically, it is important to position the reinforcing region on the part of the gasket that is most stressed in terms of thermal and pressure loads. When the solid portion extends between the two abovementioned parallel edges of the gasket, the distance between the edge delimiting a part of the contour of the opening and any element of the reinforcing region can be less than one third of the distance between said parallel edges of the gasket.

The flap may comprise a second part that is separated from the first part by the pin of the flap, said second part being flush with the solid portion when the flap is in a closed position.

Preferably, the two parts of the flap are flat. These two parts can be in continuity of one another, the first part of the flap being in contact with one face of the gasket and the second part of said flap being flush with the opposite face of said gasket, when the flap is in a closed position. The part of the gasket that is subject to the deformations is thus the solid portion which is located under the second part of the flap and which borders the opening intended to be closed off by the first part of the flap.

Advantageously, the reinforcing region is a hollow region in relief. This type of reinforcement remains particularly effective while doing away with addition of material, which could increase the weight of the flap and increase its size. Such a hollow region can be produced so as to create at least one boss, or at least one hollow, said solutions being equivalent with regard to the stated objective. One or the other of these two solutions will be preferred depending on the internal geometry of the valve.

Advantageously, the reinforcing region is a rib which extends parallel to the rotary pin of the flap and is adjacent to the opening in said gasket. Specifically, it is not necessary for the reinforcing region to be extensive on the gasket. It may be on the gasket in the right position to contain the forces due to the gases, such that said gasket does not deform. This rib may be either continuous or discontinuous. The most effective position of the rib is when it extends parallel to the pin of the flap, close to the opening. The expression "close to the opening" means that it is located in the third of the solid portion of the gasket that is closest to the opening.

Preferably, the reinforcing region is produced by stamping the gasket. Stamping is a simple, rapid and clearly effective method for obtaining a hollow relief with the desired shape and size.

According to another preferred embodiment of a valve according to the invention, the reinforcing region consists of a thickness of added material. For this configuration, it may be for example a strip of thin metal which is welded to said gasket and the thickness of which does not exceed a millimeter. According to this other preferred embodiment, the reinforcing region can extend parallel to the rotary pin of the flap.

Preferably, the flap and the gasket are made of stainless steel.

Advantageously, the gasket is fastened to the body of the valve by being inserted at its peripheral edge between two elements of the body. The two elements of the body are for example cast elements. In this way, an annular and peripheral part of the gasket serves to anchor the gasket in the valve, the rest of said gasket being available to cooperate with the flap and provide the desired sealing conditions.

Advantageously, the two cast elements are made of aluminum. In a variant, one of the cast elements may be made of aluminum while the other cast element is made of cast iron or stainless steel.

Throughout the preceding text, the gasket may be flat, that is to say that the opposite faces of the gasket may each belong exclusively to a given plane.

In a variant, only a part of the gasket may be flat.

A second subject of the invention is a gasket for producing an engine control valve according to the invention. The main feature of this gasket will be that it has a reinforcing region.

The valves according to the invention have the advantage of being effective in terms of sealing, doing away with the addition of an additional part and a fundamental redesign of their body, these being heavy and expensive solutions to implement. As a result, these valves have additional functionality on account of this increased sealing, while remaining at a constant size. The valves according to the invention moreover have the advantage of having a degree of modularity, since the reinforcing region made in the gasket can have an appropriate size and geometry, depending on the internal design of said valves and on the degree of stress which could be brought about by the gases present in these valves.

A detailed description of a preferred embodiment of a valve according to the invention is given in the following text with reference to the appended drawings, in which.

Figure 3:
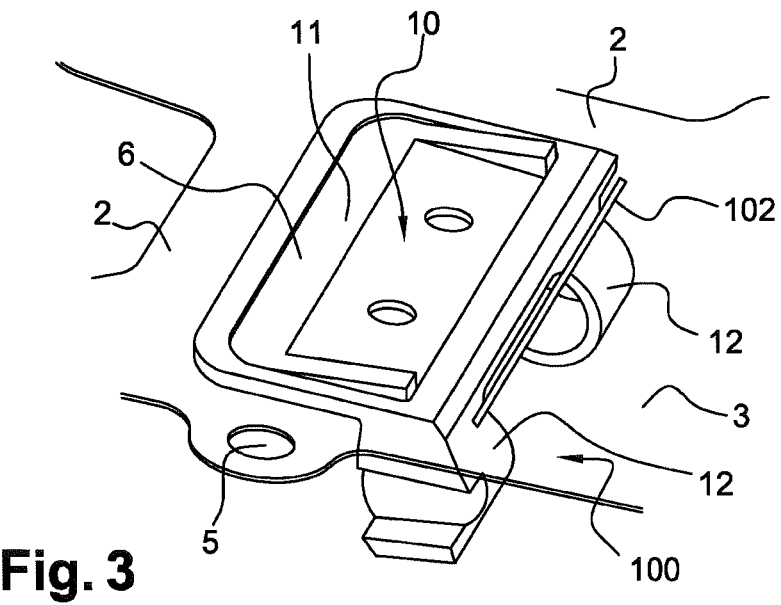
FIG. 3 is a partial view of a flap and a gasket of a valve according to the invention.
Figure 4:
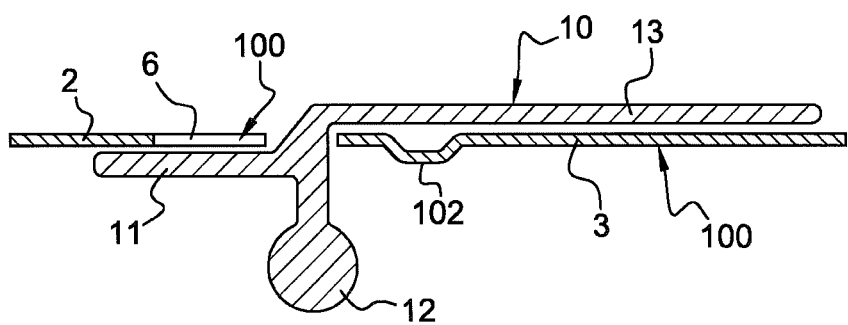
FIG. 4 is a schematic cross-sectional view of a flap and a gasket according to the invention.

Although FIGS. 3 and 4 show a valve according to the invention, they also serve as a basis for the description of a prior art valve, as far as the common parts, which are in the majority, are concerned.

An engine control valve according to one exemplary embodiment of the invention can be formed for example by an EGR (Exhaust Gas Recirculation) valve that regulates the flow rate of the gases through a loop connecting an exhaust circuit to an air intake circuit of a vehicle combustion engine.

Figure 1:
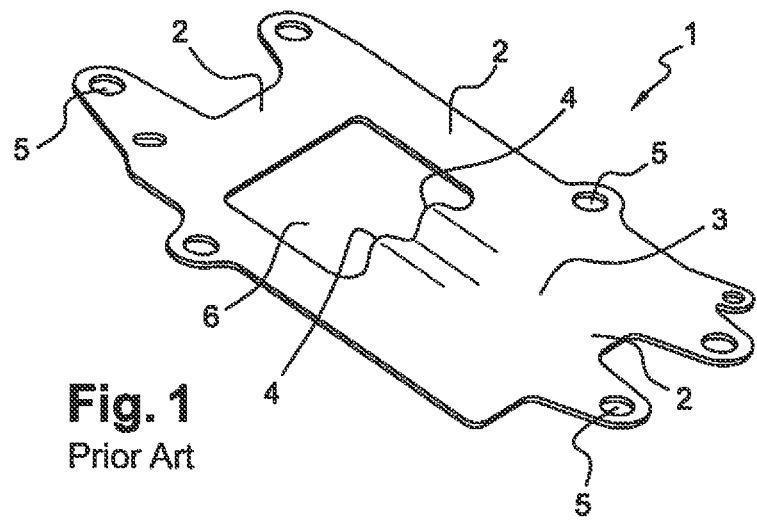
FIG. 1 is a line drawing of a deformed prior art gasket.

With reference to FIG. 1, a prior art gasket 1 is made of rigid stainless steel and is inserted at its peripheral edge 2 between two cast aluminum elements of the body of said valve 1. This peripheral edge 2 thus has a number of orifices 5 that are intended to be passed through by screws so as to fasten the gasket 1 between said cast elements. This gasket 1 is flat, having a substantially rectangular shape with a small thickness, and has a solid portion 3 and a passage opening 6 for the gases.

With reference to FIGS. 3 and 4, this type of valve 1 comprises an internal duct and functions with a flap 10 that is rotationally mobile between a completely open position, in which it allows the gases to pass through the duct at a maximum flow rate, and a closed position in which it closes off said duct entirely. The flap 10 is rectangular overall in the example described and has a first rectangular part 11 and a second rectangular part 13 which are located on either side of a rotary pin 12, said parts 11 being flat, in continuity of one another, and being fastened rigidly together. The flap 10 is mounted so as to rotate in the valve 10 such that in the closed position, the first part 11 of the flap 10 closes off the opening 6 by coming into contact with one face of said gasket 1, and such that the second part 13 of the flap 10 is flush with the opposite face of said gasket 1 in the region of the solid portion 3. The rotary pin 12 of the flap 10 is positioned perpendicularly to the opening 6 in the gasket 1 in the region of said opening 6 that is closest to the solid portion 3 of the gasket 1. When the flap 10 opens to allow the gases to pass through, the two parts 11, 13 pivot simultaneously so as to move away from the face of the gasket 1 against which they were bearing or flush.

With reference to FIG. 1, a prior art gasket 1 is extensive, since it entirely covers the two parts 11, 13 of the flap, that is to say its external contour externally surrounds the external contour of the flap 10. By being inserted at its periphery 2 between two cast elements which are for example both made of aluminum or of aluminum in the case of one and stainless steel or cast iron in the case of the other, the gasket 1 has an unsupported, and thus structurally weak, central region that is likely to deform under the combined effect of the pressure and the temperature of the gases. Specifically, since the gasket 1 is fastened at its periphery 2, only its central part, the movement of which is not restricted, can be subjected to the effects of thermal expansion.

This deformation can cause the gasket 1 to warp, creating bosses 4 in the solid part 3 bordering the opening 6. In the closed position of the flap 10, these bosses 4 or hollows are located under the second part 13 of the flap 10. These bosses 4 or these hollows thus create passages for the gases, notably when the valve 1 is in the closed position, making its sealing low quality.

Figure 2:
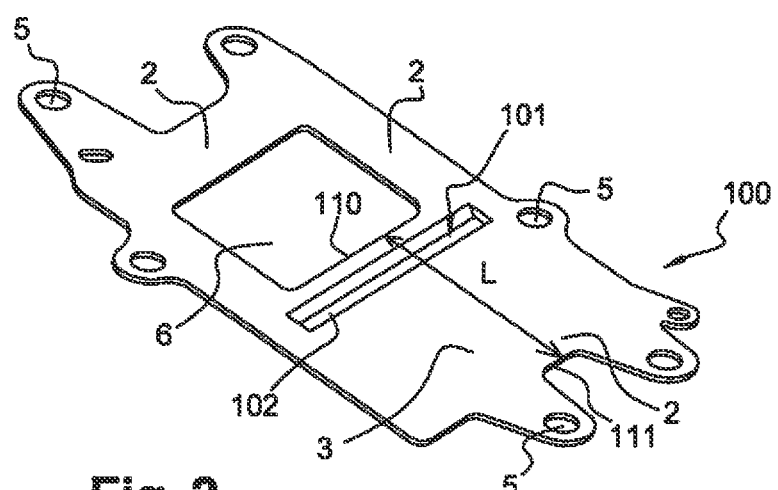
FIG. 2 is a line drawing of a gasket according to the invention.

With reference to FIGS. 2, 3 and 4, the gasket 100 of a valve according to one exemplary embodiment of the invention differs from a gasket 1 of a prior art valve in that it has a reinforcing region 101 in its part which is most likely to deform under the effect of the hot gases under pressure. All the other features of the gasket 1 are retained. This reinforcing region 101 is preferably located in the solid portion 3 of the gasket 100 bordering the opening 6. This reinforcing region 101 consists in the example described of an elongate and hollow groove 102 which extends parallel to a short side of the rectangular gasket 100 and is made in the solid portion 3 of said gasket 100, somewhat set back from the opening 6. This groove 102 is continuous in the example described and its length is less than the width of the gasket 100, corresponding to its short side. This groove 102 is produced notably by stamping the gasket 100 in the required area, which is preferably located in the third of the solid portion 3 that is closest to the opening 6.

In the example described, the solid portion extends between two edges 110 parallel to the rotary pin of the flap 10. The edge 110 forms a part of the contour of the opening 6 while the edge 111 forms a part of the external contour of the gasket 1. The groove 102 is preferably contained in a region that is at a distance from the edge 110 of less than one third the distance L between the edges 110 and 111.

The invention claimed is:

1. An engine control valve having a body that delimits an internal duct and comprising:
    a flap mounted in a pivoting manner by way of a pin, said flap comprising a first part and being able to pivot between an open position allowing fluid to pass through the duct and a closed position in which the flap comes into contact with a gasket of the valve,
    said gasket having an external contour that externally surrounds the external contour of the flap and comprising an opening and a solid portion, said first part closing off the opening in the gasket when the flap is in a closed position,
    the gasket having a reinforcing region in its solid portion, so as to prevent said gasket from deforming under the effect of a high pressure and a high temperature of the gases present in said valve, and
    wherein the reinforcing region is a hallow region in relief.

2. The valve as claimed in claim 1, wherein the flap comprises a second part that is separated from the first part by the pin of the flap, said second part being flush with the solid portion when the flap is in a closed position.

3. The valve as claimed in claim 1, wherein the reinforcing region is positioned at least partially in the third of the solid portion of the gasket that is located closest to the opening.

4. The valve as claimed in claim 1, wherein the reinforcing region is a rib which extends parallel to the rotary pin of the flap and is adjacent to the opening in said gasket.

5. The valve as claimed in claim 1, wherein the reinforcing region is produced by stamping the gasket.

6. The valve as claimed in claim 1, wherein the reinforcing region consists of a thickness of added material.

7. The valve as claimed in claim 6, wherein the reinforcing region extends parallel to the rotary pin of the flap.

8. The valve as claimed in claim 2, wherein the two parts of the flap are flat, the first part of the flap being in contact with one face of the gasket and the second part of said flap being flush with the opposite face of said gasket when the flap is in a closed position.

9. The valve as claimed in claim 1, wherein the gasket is fastened to the body of the valve by being inserted at its peripheral edge between two cast elements of the body.

10. The valve as claimed in claim 1, wherein the gasket is flat.

11. An engine control valve having a body that delimits an internal duct, the engine control valve comprising:
    a flap mounted in a pivoting manner by way of a pin, said flap comprising a first part and being able to pivot between an open position allowing fluid to pass through the duct and a closed position in which the flap comes into contact with a gasket of the valve,
    said gasket having an external contour that externally surrounds the external contour of the flap and comprising an opening and a solid portion, said first part closing off the opening in the gasket when the flap is in a closed position,
    the gasket having a reinforcing region in its solid portion, so as to prevent said gasket from deforming under the effect of a high pressure and a high temperature of the gases present in said valve,
    wherein the flap comprises a second part that is separated from the first part by the pin of the flap, said second part being flush with the solid portion when the flap is in a closed position, and
    wherein the two parts of the flap are flat, the first part of the flap being in contact with one face of the gasket and the second part of said flap being flush with the opposite face of said gasket when the flap is in a closed position.

\* \* \* \* \*